United States Patent [19]

Dawdy

[11] Patent Number: 4,769,419

[45] Date of Patent: Sep. 6, 1988

[54] MODIFIED STRUCTURAL ADHESIVES

[76] Inventor: Terrance H. Dawdy, 112 Parkway Dr., Erie, Pa. 16511

[21] Appl. No.: 936,546

[22] Filed: Dec. 1, 1986

[51] Int. Cl.$^4$ .................. C08L 63/00; C08C 19/24; C08F 226/02

[52] U.S. Cl. .................. 525/111; 525/113; 525/123; 525/340; 525/455; 525/374; 206/568; 526/301

[58] Field of Search .......... 525/123, 455, 374, 111, 525/113, 340; 206/223, 568

[56] References Cited

U.S. PATENT DOCUMENTS

| 3,392,154 | 7/1968 | Baldwin | 525/123 |
| 3,674,743 | 7/1972 | Verdol et al. | 525/123 |
| 3,725,504 | 4/1973 | Owston | 525/215 |
| 3,873,640 | 3/1975 | Owston et al. | 525/126 |
| 4,025,578 | 5/1977 | Siebert | 525/122 |
| 4,055,541 | 10/1977 | Riew | 528/119 |
| 4,107,116 | 8/1978 | Riew | 525/107 |

Primary Examiner—Joseph L. Schofer
Assistant Examiner—Peter F. Kulkosky

[57] ABSTRACT

Novel structural adhesive compositions for metal-bonding applications. The adhesives comprise olefinic-terminated liquid rubbers which are reacted with monoisocyanate compounds. The compositions according to the present invention are especially useful in formulating ambient temperature curable structural adhesive compositions.

20 Claims, No Drawings

MODIFIED STRUCTURAL ADHESIVES

BACKGROUND OF THE INVENTION

The present invention relates to structural adhesive compositions. More particularly, the invention relates to improving environmental resistance and low temperature properties of acrylic structural adhesive compositions.

Acrylic structural adhesive compositions are well-known articles of commerce which are extensively used commercially for bonding metal and plastic materials. The load-bearing and stress-relieving properties of structural adhesives, as well as their bond strength, which can exceed the strength of the materials which are being bonded, make these adhesives attrative alternatives to or replacements for mechanical methods, such as riveting or spot welding, of joining materials, especially where it is preferable to distribute load stresses over larger areas rather than to concentrate such stresses at a few points. Their use can reduce or eliminate costly finishing operations necessitated by mechanical joining methods, present a more pleasing exterior and at least reduce the possiblity of corrosion of assemblies containing one or more metal components. Additionally, they can be used to bond a diversity of metals without extensive surface preparation. For example, Zalucha et al U.S. Pat. No. 4,223,115 and Briggs et al U.S. Pat. No. 3,890,407 disclose acrylic structural adhesive compositions which are effective bonding materials for oily metal surfaces.

Despite the attractiveness of acrylic structural adhesives, they are not without deficiency. For example, an application area for such adhesives is in the bonding of lightweight metal and plastic materials in the fabrication of vehicle bodies and component parts. A requirement in many applications is for satisfactory adhesion at temperatures below $-25°$ C. While acrylic structural adhesives provide excellent bond characteristics at ambient temperatures, they, as with almost all adhesives, become embrittled and suffer significant loss of adhesion and impact resistance at these low temperatures. There is a demonstrated need for acrylic structural adhesives with good low temperaure properties.

The use of elastomers in acrylic structural adhesives to improve low temperature properties, such as impact resistance, is well known. While both solid gum and liquid elastomers can be utilized for this purpose, the limited solubility and greater incompatibility of the solid elastomers can restrict their use, especially at higher levels of elastomer concentration. Liquid elastomers, especially olefinic-terminated liquid elastomers are attractive candidates for use with free radical-cured acrylic structural adhesives. Such elastomers have been commercially available for a number of years and have been widely used as toughening agents for polyester molding compounds.

Representative of the olefinic-terminated liquid elastomers are the methacrylate-terminated polybutadiene homopolymers and copolymers which can be prepared by esterification reaction of glycidyl methacrylate with carboxyl-terminated polybutadiene, poly(butadiene-(meth)acrylonitrile) or poly(butadiene-(meth)acrylonitrile-styrene). Investigations into the use of such methacrylate-terminated liquid elastomers for improving low temperature properties of free radical-cured acrylic structural adhesives demonstrated that these compounds do indeed improve low temperature shear, impact and peel strengths with only slight sacrifice in room temperature shear strength. Unfortunately, the acrylic structural adhesives containing such liquid elastomers exhibit a severe sensitivity to moisture as evidenced by losses of up to 50 percent of original bond strength after as little as two weeks exposure to aggresive environments such as boiling water and salt spray.

Continued investigations into the use of olefinic-terminated liquid elastomers resulted in the discovery that environmental resistance of free radical-cured acrylic structural adhesives containing olefinic-terminated liquid elastomers is unexpectedly and dramatically improved with no significant loss in low temperature and ambient temperature adhesion properties if the secondary hydroxyl group(s) which such liquid elastomers contain are reacted with monoisocyanate compounds. It has been found that the retention of initial bond strength after two weeks of environmental cycling increased from 58 percent in the case of an unmodified liquid elastomer to 97 percent when isocyanate capping was carried out at 95 percent of theory. In addition, adhesion to galvanized steel is unexpectedly enhanced when the esterification of the carboxyl-functional liquid elastomer is foreced to completion prior to isocyanate capping. For example, when the liquid elastomer has a residual acid value of 3-5 prior to capping, torsional impact strengths in the range of 30 in. lbs. are observed; whereas if the esterification is carried out to near completion (acid no. 1.0), torsional impact strengths of greater than 50 in. lb. are observed.

SUMMARY OF THE INVENTION

Thus, in accordance with one aspect of this invention, there are provided novel urethane modified olefinic-terminated liquid elastomers. In accordance with another aspect of the invention, there are provided novel free radical-cured acrylic structural adhesive compositions containing the urethane modified olefinic-terminated liquid elastomers. Other aspects of the invention are readily discernible from the disclosure and appended claims.

The urethane modified olefinic-terminated liquid elastomers of this invention have the formula:

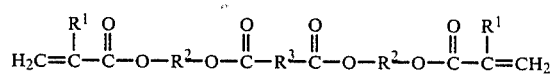

wherein $R^1$ is hydrogen, an alkyl group of 1 to 4 carbon atoms, $-CH=CH_2$, or $-R^4-CH=CH_2$ wherein $R^4$ is an alkylene group of 1 to 4 carbon atoms;

$R^2$ is

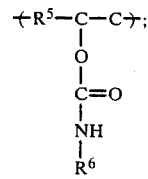

wherein $R^5$ is an alkylene group having from 1 to 6 carbon atoms; and $R^6$ is phenyl, naphthyl, an alkylene group having from 1 to 24 carbon atoms or m-isopropenyl-α,α-dimethyl benzyl; and $R^3$ is

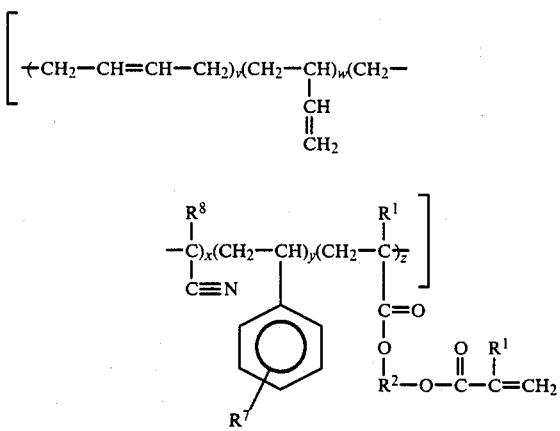

wherein $R^1$ and $R^2$ are as previously defined, $R^7$ is —CH=CH$_2$ or

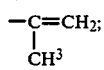

$R^8$ is hydrogen or methyl; and v is from about 5 to about 98 percent by weight; w is from zero to about 95 percent by weight percent; x is from zero to about 40 percent by weight; y is from zero to about 40 percent by weight; and z is from zero to about 5 percent by weight; said percent by weight being based on the total weight of $R^3$.

DESCRIPTION OF THE PREFERRED EMBODIMENTS

Precursor compounds from which the novel urethane modified olefinic-terminated liquid elastomers of the invention are prepared, are available commercially. They are otherwise easily prepared by reacting olefinic monoepoxide compounds with polycarboxylic homopolymers of conjugated dienes having from 4 to 12 carbon atoms and copolymers of such conjugated dienes and one or more monomers selected from the group consisting of acrylonitrile, methacrylonitrile, styrene, acrylic and methacrylic acid. Preferably, this esterification is carried out to an acid member of about 1.0 or less. These precursor compounds, which are characterized by the presence of nascent secondary hydroxyl groups, are then reacted with a monoisocyanate in an amount no less than 80% of theory, based upon the hydroxyls of the precursor, and preferably no greater than 95% of theory, with the reaction being terminated at an NCO endpoint of zero percent.

Substantially any liquid polyalkadiene which has two or more carboxyl groups can be employed as the conjugated diene in forming the urethane modified olefinic-terminated liquid elastomers of this invention. As employed herein the term "polyalkadiene" is understood to refer to polymers of conjugated dienes having from 4 to 12 carbon atoms and includes not only homopolymers of such dienes but also copolymers of such dienes and one or more other monomers copolymerized therewith, such other monomers preferably being selected from the group consisting of acrylonitrile, methacrylonitrile, styrene and olefinic monocarboxylic acids, with acrylic and methacrylic acids being the preferred acids when these compounds are used. Preferred polyalkadienes are carboxylated polybutadiene, carboxylated poly(butadiene-acrylonitrile) and carboxylated poly(butadiene-(meth)acrylonitrile-acrylic acid) liquid rubbers. The manner of preparing carboxylated polyalkadienes is sufficiently well-known that no discussion here is necessary, and a variety of such liquid elastomers are commercially available.

The olefinic monoepoxides, a variety of which are commercially available, can be easily prepared by reacting aliphatic diepoxide having from 3 to 8 carbon atoms with olefinic monocarboxylic acids in the presence of an appropriate catalyst. They are preferably made by reacting a halogenated monoepoxide, such as epichlorhydrin with olefinic monocarboxylic acids. Acrylic and methacrylic acid are currently preferred of the unsaturated acids which can be employed in the practice of the invention.

An intermediate reaction between the carboxylated liquid elastomer and the olefinic monoepoxide results in a precursor compound characterized by the presence of at lest two nascent secondary hydroxy groups. This intermediate reaction is typically effected at temperatures in the range from about 40° C. to about 120° C., generally in the presence of a catalyst. The secondary hydroxyl moieties are reacted out by contacting the olefinic liquid elastomer with one or more monoisocyanate compounds, with aromatic monoisocyanates being especially preferred. Representative monoisocyanate compounds include isocyanatoethyl acrylate, isocyanatomethyl methacrylate, isocyanatoethyl methacrylate, phenyl isocyanate, naphthyl isocyanate, octadecyl isocyanate and [benzene, 1-(1-isocyanto-1-methyl ethyl)-4-(1-methyl ethenyl)], with phenyl isocyanate being preferred.

The resulting urethane modified olefinic-terminated liquid elastomer has the formula

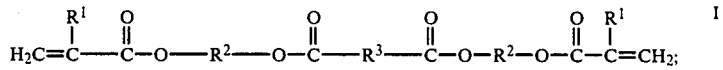

wherein $R^1$ is hydrogen, an alkyl group of 1 to 4 carbon atoms, —CH=CH$_2$, or —R$^4$—CH=CH$_2$ wherein $R^4$ is an alkylene group of 1 to 4 carbon atoms;

$R^2$ is

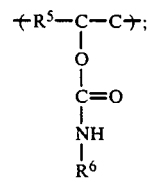

wherin $R^5$ is an alkylene group having from 1 to 6 carbon atoms and $R^6$ is phenyl, naphthyl, alkylene group having from 1 to 24 carbon atoms or m-isopropenyl-α,α-dimethylbenzyl; and
$R^3$ is

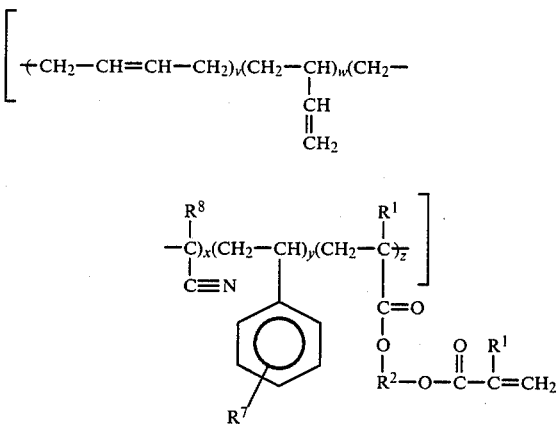

wherein $R^1$ and $R^2$ are as previously defined, $R^7$ is —CH=CH$_2$ or

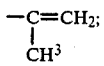

$R^8$ is hydrogen or methyl; and v is in the range from about 5 to about 98, preferably about 55 to about 98 percent by weight; w is from zero to about 95, preferably about 2 to about 12 percent by weight; x is from zero to about 40, preferably zero to about 26 percent by weight; y is from zero to about 40, preferably zero to about 26 percent by weight; and z is in the range from zero to about 5 preferably zero to about 0.5 percent by weight; said percent by weight being based on the total weight of $R^3$.

The resulting urethane modified olefinic-terminated liquid elastomers have been found to be especially useful in formulating improved ambient temperature-curable acrylic structural adhesive compositions. Thus, in accordance with a second aspect of this invention, there are provided novel ambient temperature-curable structural adhesive compositions comprising (A) from about 10 to about 80 percent by weight of an urethane modified olefinic-terminated liquid elastomer as represented by formula I;

(B) from about 20 to about 90 percent by weight of an olefinic monomer selected from the group consisting of acrylic acid, substituted acrylic acid, esters of acrylic acid, styrene and substituted styrene;

(C) from 0 to about 40 percent by weight of an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate groups;

(D) from 0 to about 20 percent by weight of a phosphorus-containing compound having one or more olefinic group and no less than one P—OH group; and (E) an ambient temperature-active free radical source which is capable of initiating and propagating the cure of said adhesive composition the weight percents of each of (A) through and including (E) being based on the total weight of (A) through and including (E);

(F) from about 0.05 to about 10 percent by weight, based on the total weight of (A) through and including (E) of at least one oxidizing agent which is interactive with a peroxygen compound to product free radicals which are capable of initiating and propagating free radical polymerization reactions.

The free radical-polymerizable acrylic structural adhesive compositions of the invention are normally provided as two-package adhesive systems, with the packages being mixed at the time of use to provide a free radical curable adhesive. These adhesive compositions comprise (I) a first package comprising
 (A) from about 10 to about 80 percent by weight of an urethane modified olefinic-terminated liquid elastomer as represented by formula I;
 (B) from about 10 to about 90 percent by weight of a olefinic monomer selected from the group consisting of acrylic acid substituted acrylic acid, esters of acrylic acid or substituted acrylic acid, styrene and substituted styrene;
 (C) from 0 to about 40 percent by weight of an olefinic urethane reaction product of a isocyanate-functional prepolymer and a hydroxy-functional monomer having at least one unit of polymerizable unsaturation, such reaction product being characterized by the presence of at least two units of unsaturation and the substantial absence of free isocyanate groups;
 (D) from 0 to about 20 percent by weight of a phosphorus-containing compound having one or more olefinic groups and no less than one P—OH group;
 the weight percents of each of (A) through and including (D) being based on the total weight of (A) through and including (D);
 (E) from about 0.05 to about 10 percent by weight, based on the total weight of (A) through and including (D) of a reducing agent which is interactive with a peroxygen compound to produce free radicals which are capable of initiating and propagating free radical polymerization reactions; and (II) said second package comprising a bonding accelerator containing an oxidizing agent of a room temperature-active redox couple catalyst system, said oxidizing agent being reactive at room temperature with said agent (E) when said first and second packages are mixed to produce free radicals which are capable of initiating and propagating free radical polymerization reactions, the amount of said oxidizing agent being sufficient to interact with the total amount of agent (E).

The amount of the urethane modified olefinic terminated liquid elastomers is in the range from about 10 to about 80, preferably from about 20 to about 50 percent by weight; the amount of olefinic urethane reaction product is in the range from 0 to about 40, preferably from 0 to about 25 percent by weight based on total weight of the first package; the amount of said phosphorus-containing compound is in the range from 0 to about 20 preferably from about 2 to about 10 percent by weight based on total weight of the first package; said reducing agent is present in an amount from about 0.05 to about 10, preferably from about 0.1 to about 6 percent by weight based on total weight of the pack; and the amount of said oxidizing agent is in the range from about 0.5 to about 50 percent by weight based on total weight of the second package.

The acrylic adhesive systems of the invention can optionally contain up to about 50, preferably not more than about 25 percent by weight based on total weight of the first package of at least one polymerizable olefinic non-acrylic monomer; up to about 60 preferably not more than about 30 percent by weight based on total weight of the first package of a polymeric material having an intrinsic viscosity from about 0.1 to about 1.3, such polymeric material being obtained from the polymerization of a styrene monomer, acrylic monomer, substituted acrylic monomer, olefinic non-acrylic monomer or mixtures thereof; up to about 5 percent by weight of an unsaturated dicarboxylic acid ester; up to about 20 percent by weight of an unsaturated carboxylic acid having one or more, preferably one, carboxylic acid group; and up to about 1 percent by weight of a waxy substance selected from the group consisting of paraffin wax, beeswax, ceresin wax and spermaceti wax.

Monomeric liquid olefinic compounds suitable for use in the adhesive compositions of the invention for forming polymer-in-monomer syrups and as additional polymerizable materials are characterized by the presence of —C═C— group. The olefinic group is preferably a 2-ethylhexyl methacrylate hexyl methacrylate vinyl group, more preferably terminally located, with acrylic and substituted acrylic monomers being currently preferred. Representative olefinic monomers include, without limitation, methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexylmethacrylate, lauryl methacrylate, tetrahydrofurfuryl methacrylate, methacrylic acid, acrylic acid, acrylonitrile, methacrylonitrile, styrene, vinyl styrene, vinyl acetate, chlorostyrene, glycidyl methacrylate, itaconic acid, acrylamide, methacrylamide, vinylidene chloride, 2,3-dichloro-1,3-butadiene, 2-chloro-1,3-butadiene, methylstyrene and n-butylstyrene.

Polymers containing the grouping $(CH_2—CCl═CH—CH_2)_n$, wherein n is an integer, are well-known in the art under the name neoprene, which is produced by the polymerization of 2-chloro-1,3-butadiene.

The olefinic urethane is the reaction product of an isocyanate functional prepolymer and a hydroxyl functional monomer. The isocyanate-functional prepolymers which are suitable for use in the practice of this invention are well-known. Typically, such prepolymers are adducts or condensation products of polyisocyanate compounds having at least two free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least two free, unreacted isocyanate groups.

Polyols useful in preparing isocyanate-functional prepolymer used in the present invention preferably have an average molecular weight of from about 50 to about 3,000. Suitable polyols include polyalkylene glycols such as polyethylene glycols; polyetherpolyols such as those prepared by addition polymerization of ethylene oxide and a polyol such as trimethylol propane in a ratio to provide unreacted hydroxyl groups in the product; organic hydroxylated elastomers exhibiting second order glass transition temperatures below about 5° C., such as poly(butadiene-styrene)polyols and poly(butadiene)polyols; polyester polyols such as are prepared by polymerizing polyols, such as diethylene glycol, trimethylol propane or 1,4-butanediol, with polycarboxylic acids, such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linseed oil and blown soya oil; and polyesterpolyols such as are prepared by the polymerization of a lactone such as epsilon caprolactone.

Polyisocyanates which can be reacted with polyols to form isocyanate-functional prepolymers for use in the present invention can be any isocyanate compound having at least two free isocyanate groups, including aliphatic, cycloaliphatic and aromatic compounds. Representative isocyanates include, without limitation thereto, 2,4-toluene diisocyanate, 2,6-toluene diisocyanate, 4,4'-diphenylmethane diisocyanate, m- and p-phenylene diisocyanate, polymethylene poly(phenyl isocyanate), hexamethylene diisocyanate, 4,4'-methylenebis(cyclohexyl isocyanate), isophorone diisocyanate, and other aliphatic, heterocyclic and aromatic polyisocyanates, and including mixtures of such polyisocyanates. Currently, cycloaliphatic and aromatic polyisocyanates are preferred.

Hydroxy-functional compounds which can be employed to introduce unsaturation into the isocyanate-functional prepolymer include, without limitation, hydroxyethyl acrylate, hydroxyethyl methacrylate, alkyl alcohol, and vinyl alcohol.

Non-acrylic monomers which can be employed in the herein-described adhesive systems include styrene, chlorostyrene, vinyl styrene and vinyl acetate.

Polymeric materials having an intrinsic viscosity from about 0.1 to about 1.3 which are suitable for use in the present invention can be obtained by the polymerization of one or more acrylic and nonacrylic monomers, including mixtures thereof. Exemplary polymeric materials include poly(methyl methacrylate/n-butylacrylate/ethyl acrylate) (90/5/5); poly(n-butyl methacrylate/isobutyl methacrylate) (50/50); poly(n-butyl methacrylate) and poly(ethyl methacrylate). Preferably, the viscosity will be about midway in the recited range.

The epoxy compounds which are suitable for use in the invention can be any monomeric or polymeric compound or mixture of compounds having 1,2-epoxy greater than one, that is, wherein the average number of 1,2-epoxy groups per molecule is greater than 1; with polymeric epoxide compounds having a molecular weight in the range from about 300 to about 10,000. Epoxy compounds are well-known, see for example, U.S. Pat. Nos. 2,467,171; 2,615,007; 2,716,123; 3,030,336 and 3,053,855. Useful epoxy compounds include the polyglycidyl ethers of polyhydric alcohols, such as ethylene glycol, triethylene glycol, 1,2-propylene glycol, 1,5-pentanediol, 1,2,6-hexanetriol, glycerol and 2,2-bis(4-hydroxy-cyclohexyl)propane; the polyglycidyl esters of aliphatic or aromatic polycarboxylic acids, such as oxalic acid, succinic acid, glutaric acid, terephthalic acid, 2,6-naphthalene dicarboxylic acid and dimerized linolenic acid; and the polyglycidyl ethers of polyphenols, such as Bisphenol A, 1,1-bis(4-hydroxyphenyl)ethane, 1,1-bis(hydroxyphenyl)isobutane, 2,2-bis(4-hydroxy-t-butylphenyl)propane, 1,5-dihydroxynaphthalene and novolak resins; with cycloaliphatic polyglycidyl compounds being currently preferred.

Phosphorus-containing compounds which have been found to enhance metal adhesion, are selected from the group consisting of derivatives of phosphinic acid, phosphonic acid and phosphoric acid having at least one P—OH group and at least one organic moiety characterized by the presence of an olefinic group, which is preferably terminally located. A listing of these phosphorus compounds is found in Zalucha et al U.S. Pat. No. 4,223,115, the disclosure of which, especially column 11, line 36 to column 13, line 46, is incorporated herein by reference.

A preferred group of phosphorus-containing compound has the formula

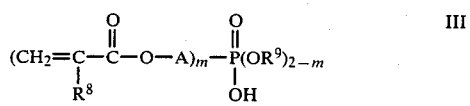

III wherein $R^8$ is selected from the group consisting of hydrogen, an alkyl group having from one to 8, preferably one to 4, carbon atoms, and $CH_2=CH-$; $R^9$ is selected from the group consisting of hydrogen, an alkyl group having from one to 8, preferably one to 4 carbon atoms; A is selected from the group consisting of $-R^{10}O-$ and $(R^{11}O)_n$, wherein $R^{10}$ is an aliphatic or cycloaliphatic alkylene group containing from one to 9, preferably 2 to 6, carbon atoms; $R^{11}$ is an alkylene group having from one to 7, preferably 2 to 4, carbon atoms; n is an integer from 2 to 10, and m is one or 2, preferably one.

Phosphorous-containing compounds having vinyl unsaturation are preferred over such compounds having allylic unsaturation, with monoesters of phosphinic, phosphonic an phosphoric acids having one unit of vinyl or allylic, especially vinyl, unsaturation presently being preferred. Representative phosphorus-containing compounds include, without limitation, phosphoric acid; 2-methacryloyloxyethyl phosphate; bis-(2-methacryloyloxyethyl)phosphate; 2-acryloyloxyethyl phosphate; bis-(2-acryloyloxyethyl)phosphate; methyl-(2-methacryloyloxyethyl)phosphate; ethyl methacryloyloxyethyl phosphate; methyl acryloyloxyethyl phosphate; ethyl acryloyloxyethyl phosphate; compounds of Formula III wherein $R^8$ is hydrogen or methyl and $R^9$ is propyl, isobutyl, ethylhexyl, halopropyl, haloisobutyl or haloethylhexyl; vinyl phosphonic acid; cyclohexene-3-phosphonic acid; alphahydroxybutene-2-phosphonic acid; 1-hydroxy-1-phenylmethane-1,1,-diphosphonic acid; 1-hydroxy-1-methyl-1-1diphosphonic acid; 1-amino-1-phenyl-1,1-diphosphonic acid; 3-amino-1-hydroxypropane-1,1-diphosphonic acid; amino-tris(methylenephosphonic acid); gamma-aminopropylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl)phosphinic acid and allyl methacryloyloxyethyl phosphinic acid.

Regardless of whether incorporated into the polymerizable adhesive composition or bonding activator, the phosphorus-containing compound will be present in an amount in the range from about 0.1 to about 20, preferably about 2 to about 10 weight percent based on total weight of polymerizable adhesive composition including reducing agent.

The bonding activators which are employed in the adhesive systems of this invention consist essentially of
(1) from about 0.5 to about 50 percent by weight based on total weight of bonding activator of at least one oxidizing agent which can function as an oxidant of a redox couple catalyst system; and
(2) from about 30 to about 99.5 percent by weight, based on total weight of bonding accelerator, of a carrier vehicle. In addition, the bonding accelerator also can contain either the epoxy resin or the unsaturated organophosphorus compound.

The room temperature-reactive redox couple catalyst systems which are employed in the adhesive systems of this invention are well-known and need not be discussed herein in detail. Basically, such systems comprise at least one oxidizing agent and at least one reducing agent which are co-reactive at room temperature to generate free radicals effective in the present invention, to initiate addition polymerization reactions. Substantially, any of the known oxidizing and reducing agents which are so co-reactive can be employed in the preactice of the present invention. Representative oxidizing agents include, without limitation, organic peroxides such as benzoyl peroxide and other diacyl peroxides, hydroperoxides such as cumene hydroperoxide, peresters such as β-butylperoxybenzoate; ketone hydroperoxides such as methyl ethyl ketone, organic salts of transition metals such as cobalt naphthenate, and compounds containing a labile chlorine such as sulfonyl chloride. Representative reducing agents include, without limitation, sulfinic acids; azo compounds such as azoisobutyric acid dinitrile; alpha-aminosulfones such as bis(tolylsulfonmethyl)-benzyl amine; tertiary amines such as diisopropyl-p-toluidine, dimethyl aniline and dimethyl-p-toluidine; and aminealdehyde condensation products, for example, the condensation products of aliphatic aldehydes such as butyraldehyde with primary amines such as aniline or butylamine. The use of known accelerators and promoters with the redox couple catalyst systems can be advantageous. Preferably, the oxidizing agent will be present in an amount in the range from about 0.5 to about 50 percent by weight of bonding accelerator, with the amount of reducing agent being in the range from about 0.05 to about 10 preferably about 0.1 to about 6, percent by weight of polymerizable adhesive composition.

The carrier vehicles which are suitable for use in the bonding activators of the present invention can be a simple inert solvent or diluent such as methylene chloride, or butyl benzyl phthalate, including mixtures of such solvents or diluents. The carrier vehicle should contain not more than 5% by weight of any moiety which is reactive with the oxidizing agent at room temperature. The carrier vehicle can be a more complex mixture including at least one film-forming binder in addition to inert solvent or diluent. In this case, the film-forming binder is preferably substantially inert with respect to the oxidant which is present in the accelerator composition. A particularly preferred carrier vehicle comprising at least one film-forming binder is an admixture comprising from about 0.05 to about 50 percent by weight of, (1), at least one saturated organic polymeric film-forming binder having a glass transition temperature in the range from about 0° C. to about 150° C. or, (2), at least one polymer-in-monomer syrup as described herein; and from about 40 to about 99 percent by weight of at least one organic solvent capable of maintaining the film-forming binder, phosphorus-containing compound when incorporated into the bonding activator composition, and oxidizing agent as a stable solution or dispersion. Among the polymeric film-forming binder materials which can be employed in the carrier vehicle are, without limitation, polyalkylacrylates and methacrylates and copolymers thereof, polystyrene and copolymers thereof, vinyl polymers and copolymers, polyesters, polyketones, polysulfones, phenolic resins, polyvinyl butyrals, and poycarbonates. The carrier vehicle can contain, in addition to solvent or solvent and film-forming binder, additives such as external plasticizers, flexibilizers, suspenders, and stabilizers, providing that any such additives do not unacceptably adversely affect the stability of the activator compositions.

Because the addition of phosphorus-containing compounds to polymerizable acrylic adhesive compositions can have a retarding effect which is directly proportional to the amount of such compounds, the addition of from about 0.01 to 10 preferably from about 0.5 to about 5 percent by weight of polymerizable materials of tertiary amines having the formula

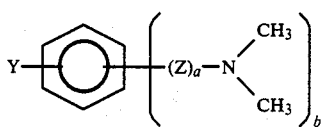

II wherein Z is methylene; Y is selected from the group consisting of hydrogen, hydroxy, amino, halogen, alkyl of 1 to 8, preferably 1 to 4, carbon atoms, and alkoxy having from 1 to 8, preferably 1 to 4, carbon atoms, 1 is zero, or 1; and b is 1 or 2 is advantageous in accelerating the cure of such compositions containing the unsaturated organophosphorus compounds. Especially preferred of such tertiary amines are N,N-dimethyl aniline and N,N-dimethylaminomethylphenol. It is significant to note that tertiary amines which do not have the formula II are not effective as cure accelerators for polymerizable acrylic adhesive compositions containing unsaturated organophosphorus compounds.

It has further been found that the environmental resistance of the herein-described adhesive systems can be improved by the addition of from about 0.005 to about 15, preferably from about 0.1 to about 10, percent by weight based on total weight of polymerizable adhesive composition of a mixture of a metal molybdate selected from the group consisting of zinc molybdate, calcium molybdate, barium molybdate, strontium molybdate and mixtures thereof, and an inert filler selected from the group consisting of zinc phosphate, calcium phosphate, magnesium phosphate, calcium carbonate and mixtures thereof, said metal molybdate being present on a volume concentration basis of from about 0.5 to about 3 parts per part of said inert filler. Such mixtures, including their preparation, are more fully described in U.S. Pat. No. 4,017,315, the disclosure of which is incorporated herein by reference.

Other additives conventionally employed in adhesive compositions, such as fillers, pigments and the like can be added to the herein-described adhesive systems.

The base adhesive compositions and bonding accelerators are prepared by conventional methods, such as are disclosed, for example, in U.S. Pat. No. 3,832,274 and U.S. Pat. No. 3,890,407.

The adhesive systems of the present invention are provided as multipack adhesive systems where one part contains the polymerizable adhesive composition and a second part contains the bonding accelerator, with the two parts being mixed at the time of use. It is necessary that the epoxy compound when incorporated into the adhesives of this invention, be kept separate from compounds having acidic moieties, such as the unsaturated organophosphorus compound and methacrylic acid to inhibit premature reaction between these components. Thus, in such cases, prior to using the compositions, one pack will contain the unsaturated organophosphorus partial ester and the other pack will contain the epoxy resin. Preferably, the epoxy resin will be incorporated into the bonding accelerator which contains the oxidant of the redox couple catalyst sytem, with the organophosphorus compound being incorporated into the pack containing the polymerizable adhesive composition. While other multipack systems are available, e.g., the bonding accelerator can contain the reductant of the redox couple catalyst system and the epoxy resin with the oxidant and polymerization inhibitors being incorporated into the pack contaning the polymerizable adhesive mass, they are less preferable with respect to shelf stability. After mixing the individual parts, one or both surfaces to be joined are coated with the mixed adhesive system and the surfaces are placed in contact with each other. The adhesive systems of the invention may be used to bond metal surfaces, such as steel, aluminum and copper, to a variety of substrates, including metal, plastics, and other polymers, reinforced plastics, fibers, glass, ceramics, wood and the like.

It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing. They can also be employed on porous substrates, unlike the anaerobic adhesives which require the exclusion of air and thus cannot be used on surfaces containing air in their pores.

The invention is illustrated by the following examples, wherein all parts, proportions and percentages are by weight unless otherwise indicated.

EXAMPLES 1–3

(a) An acrylated polybutadiene is prepared by mixing 1000 g of carboxyl-terminated polybutadiene liquid rubber, 78.1 g of glycidyl methacrylate and 0.1 g of benzoquinone. The mixture is heated with stirring to 120° C. and 5 g 1,8-diazabicyclo[5.4.0]undec-7-ene is added. The reaction mixture is maintained at 120° C. for 2.5 hrs. and cooled to room temperature. The acid value of the reaction mixture is measured at 0.087. The reaction mixture is diluted to 90 percent total solids content in cyclohexyl methacrylate and the diluted mixture is designated RM-1.

(b) 100 g RM-1, containing 0.05 equivalents of hydroxy, is mixed with 4.8 g (0.04 eq.) phenyl isocyanate and reacted for 8 hrs. at room temperature. At the end of this period, the residual isocyanate content is measured at 0. The product, acrylated polybutadiene capped with phenyl isocyanate, has 80% of theoretical hydroxy equivalents capped with phenyl isocyanate. This product is identified as II-PICAU-80.

(c) 100 g RM-1 containing 0.05 theoretical equivalents of hydroxy, is mixed with 5.7 g (0.048 eq.) phenyl isocyanate and reacted for 8 hrs. at room temperature. At the end of this period, the residual isocyanate content is measured at 0. The product, acrylated polybutadiene capped or adducted with phenyl isocyanate as 95% of theoretical hydroxyl equivalents capped (adducted) with phenyl isocyanate. This product is identified as III-PICAU-95.

(d) The products RM-1, II-PICAU-80 and III-PICAU-95 are used to prepare the following adhesives as Examples 1, 2 and 3:

| Adhesive | 1 | 2 | 3 |
|---|---|---|---|
| Ingredient (Parts by weight) | | | |
| RM-1 @ 90% | 40 | — | — |
| II-PICAU-80 | — | 40 | — |
| III-PICAU-95 | — | — | 40 |
| 2-Methacryloyloxyethyl phosphate | 2.5 | 2.5 | 2.5 |
| Methacrylic acid | 2 | 2 | 2 |
| Di-isopropyl-p-toluidine | 0.4 | 0.4 | 0.4 |
| Dimethylaniline | 0.2 | 0.2 | 0.2 |
| Calcium metasilicate | 15 | 15 | 15 |
| Calcium molybdate/calcium carbonate at 2:3 weight ratio | 3 | 3 | 3 |
| Dicyclopentadienyloxyethyl methacrylate | 32.3 | 32.3 | 32.3 |
| Silica | 3.6 | 3.6 | 3.6 |

The following accelerator, identified as IV-AA, is prepared by blending 46 parts by weight of bisphenyl A epoxy resin, 10 parts by weight bisphenol A epoxy/carboxylated butadiene-acrylonitrile liquid rubber adduct, 30 parts by weight calcium carbonate, 11 parts by weight benzoyl peroxide at 40% in butyl benzyl phthalate and 3 parts by weight silica.

Each of the 3 adhesives 1, 2 and 3 are mixed with accelerator IV-AA at a 10:3 ratio by weight and utilized to bond solvent-wiped cold-rolled steel. The fully mixed adhesives are coated onto one mating surface and a second uncoated mating surface is pressed onto the adhesive to complete the test assemblies. The total glue-line thickness is 20 mils for each test assembly. The test assemblies are cured by a cycle of 24 hrs. at room temperature followed by a 30 minute post-bake at 177° C. Lap shear tests are performed on ½ of the parts immediately after initial cooldown to room temperature after curing and on the remaining parts after exposure to the following environmental cycle test. The tests are performed according to ASTM D-1002-72. The results are as follows

| Environmental Test Program | | |
|---|---|---|
| First Day | Day 2/5 | Day 6/7 |
| 1 Hour 90° C. | 15 Min. 5% NaCl | 24 Hours 100% RH |
| 30 Min. 23.3 | 1 Hour 15 Min RT | |
| 15 Min. 5% NaCl | 22 Hrs. 30 Min. | |
| 1 mm | 100% RH | |
| 1 Hr. 15 Min RT | | |
| 21 Hours 100% RH | | |

| Adhesive | Environmental Resistance | | |
|---|---|---|---|
| | 1 | 2 | 3 |
| Pre Envir. Shear Str., psi | 1963 | 1823 | 1397 |
| Post Envir. Shear Str., psi | 1137 | 1293 | 1357 |
| % Rubber Retention | 57.9 | 70.9 | 97.0 |

EXAMPLES 4–10

The product III-Picau 95 was used to prepare the following adhesive as Examples 4–10.

| Adhesive | 4 | 5 | 6 | 7 | 8 | 9 | 10 |
|---|---|---|---|---|---|---|---|
| III-Picau 95 | 40 | 40 | 40 | 40 | 40 | 40 | 40 |
| 2-methacryloyloxyethylphosphate | 2.5 | 2.5 | 2.5 | 2.5 | 2.5 | 2.5 | 2.5 |
| Methacrylic acid | 2.5 | 2.5 | 2.5 | 2.5 | 2.5 | 2.5 | 2.5 |
| Di-isopropyl-p-toluidine | 0.6 | 0.6 | 0.6 | 0.6 | 0.6 | 0.6 | 0.6 |
| Dimethylaniline | 0.4 | 0.4 | 0.4 | 0.4 | 0.4 | 0.4 | 0.4 |
| 2,6-di-t-butylparacresol | .003 | .003 | .003 | .003 | .003 | .003 | .003 |
| Dichlorodihydroxylbenzylquinone | .003 | .003 | .003 | .003 | .003 | 003 | .003 |
| Benzylquinone | .005 | .005 | .005 | .005 | 005 | .005 | .005 |
| Ethylmethylacrylate | 25 | — | — | — | — | — | — |
| Isodesomethacrylate | — | 25 | — | — | — | — | — |
| Cyclohexylmethacrylate | — | — | 25 | — | — | — | — |
| n-hexylmethacrylate | — | — | — | 25 | — | — | — |
| Benzylmethacrylate | — | — | — | — | 25 | — | — |
| Tetrahydrofurfurylmethacrylate | — | — | — | — | — | 25 | — |
| Laurylmethacrylate | — | — | — | — | — | — | 25 |
| Calcium metasilicate | 25 | 25 | 25 | 25 | 25 | 25 | 25 |
| Silica | 3.0 | 3.0 | 3.0 | 3.0 | 3.0 | 3.0 | 3.0 |

Each of the Examples 4–10 are mixed with accelerator IV-Aa at a 10:3 ratio by weight and utilized to bond solvent wiped galvanized steel in a manner similar to Examples 1–3.

| SIDE IMPACT STRENGTH (in. lb.) | | | | | | | |
|---|---|---|---|---|---|---|---|
| Oily Q-90 | | | | | | | |
| −20° F. | 88.4 C | 88.4 C | 35 M | 93.2 C | 41.1 A | 46.0 C | 58.6 C |
| RT | 57.5 C | 49.0 M | 60.7 C | 51.0 C | 33.4 A | 52.2 C | 27.7 M |
| +185° F. | 32 C | 28.0 A | 48.3 C | — | 18.1 A | 26.6 C | — |

C - Cohesive
A - Adhesive
M - Mixed Adhesive Cohesive

What is claimed is:

1. Urethane modified olefinic-terminated liquid elastomer having the formula

wherein $R^1$ is hydrogen, an alkyl group of 1 to 4 carbon atoms, —CH=CH$_2$, or —R$^4$—CH=CH$_2$ wherein $R^4$ is an alkylene group of 1 to 4 carbon atoms;

$R^2$ is

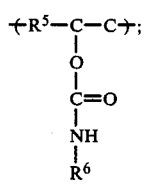

wherein $R^5$ is an alkylene group having from 1 to 6 carbon atoms and $R^6$ is phenyl, naphthyl, an alkylene group having from 1 to 24 carbon atoms or m-isopropenyl-α-α-dimethylbenzyl; and $R^3$ is

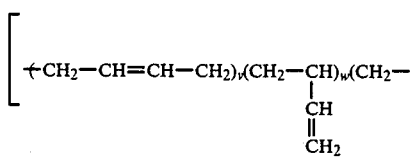

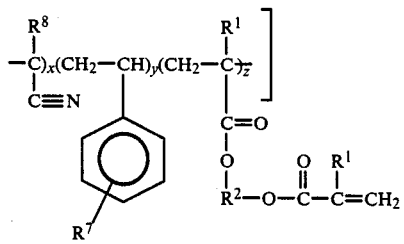

wherein $R^1$ and $R^2$ are as previously defined, $R^7$ is —CH=CH$_2$ or

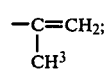

$R^8$ is hydrogen or methyl; and v from about 5 to about 98 weight; w is zero to about 95 percent by weight; x is from zero to about 40 percent by weight; y is from zero to about 40 percent by weight; and z is from zero to about 5 percent by weight; said percent by weight being based on the total weight of $R^3$.

2. A urethane olefinic-terminated liquid rubber of claim 1 wherein v is from about 55 to about 98 percent by weight;

w is from about 2 to about 12 percent by weight;

x is from 0 to about 26 percent by weight;

y is from 0 to about 26 percent by weight; and z is from 0 to about 0.5 percent by weight.

3. An ambient temperature-curable structural adhesive composition comprising (A) from about 10 to about 80 percent by weight of a urethane olefinic-terminated liquid rubber having the formula;

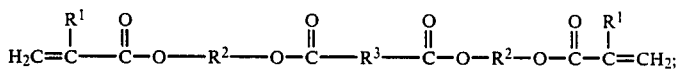

wherein $R^1$ is hydrogen, an alkyl group of 1 to 4 carbon atoms, —C=CH$_2$, or —R$^4$—CH=CH$_2$ wherein $R^4$ is an allylene group of 1 to 4 carbons atoms;

$R^2$ is

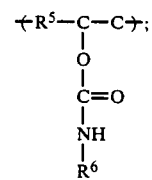

wherein $R^5$ is an alkylene group having from 1 to 6 carbon atoms and $R^6$ is phenyl, naphthyl or an alkylene group having from 1 to 24 carbon atoms or m-isoprenyl-α,α-dimethylbenzyl; and $R^3$ is

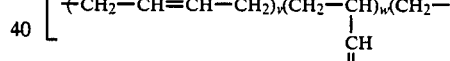

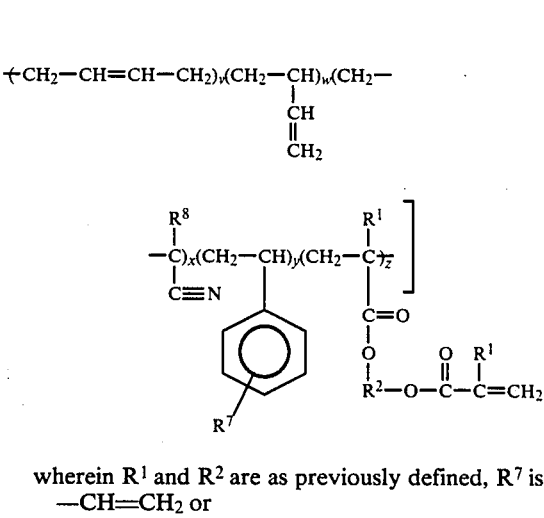

wherein $R^1$ and $R^2$ are as previously defined, $R^7$ is —CH=CH$_2$ or

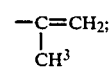

$R^8$ is hydrogen or methyl and v is in the range from about 5 to about 98 percent by weight; w is from zero to about 95 percent by weight; x is from zero to about 40 percent by weight; y is from zero to about 40 percent by weight; and z is from zero to about 5 percent by weight; said percent by weight being based on the total weight of $R^3$ (B) from about 10 to about 90 percent by weight of an olefinic monomer selected from the group consisting of methyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, 2-ethylhexylmethacrylate, hexyl methacrylate, cyclohexylmethacrylate, lauryl methacrylate, tetrahydrofurfuryl methacrylate, metharylic acid, acrylic acid, acrylonitrile, methacrylonitrile, styrene, vinyl styrene, vinyl acetate, chlorostyrene, glycidyl methacrylate, itaconic acid, acrylamide, methacrylamide, vinylidene chloride, 2,3-dichloro-1,3-butadiene, 2-chloro-1,3-butadiene, methylstyrene and n-butyl styrene;

(C) from 0 to about 40 percent by weight of an olefinic urethane reaction product of an isocyanate-functional prepolymer and a hydroxy-functional monomer having an unit of polymerizable olefinic unsaturation, such reaction product being characterized by the presence of at least two units of olefinic unsaturation and the substantial absence of free isocyanate groups wherein said hydroxy-functional monomer has an average molecular weight from about 50 to about 3,000; and said isocyanate-functional prepolymer is an adduct of polyisocyanate compound having at least two free isocyanate groups and a polyol having an molecular weight from about 50 and about 3000;

(D) from 0 to about 20 percent by weight of phosphorous-containing compound having one or more olefinic group and no less than one P—OH groups, said phosphorous-containing compound having the formula

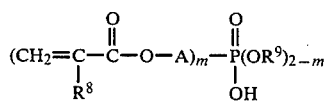

wherein $R^8$ is selected from the group consisting of hydrogen, an alkyl group having from 1 to 8 carbon atoms, and $CH_2$—CH—; $R^9$ is selected from the group consisting of hydrogen, an alkyl group having from 1 to 8 carbon atoms; A is selected from the group consisting of $R^{10}O$ and $(R^{11}O)_n$, wherein $R_{10}$ is an aliphatic or cycloaliphatic alkylene group containing from 1 to 9 carbon atoms; $R^{11}$ is an alkylene group having from 1 to 7 carbon atoms; n is an interger from 2 to 10, and m is one or two; and, (E) an ambient temperature-active free radical source which is capable of initiating and propagating the cure of said adhesive compositon the weight percents of each of (A) through and including (E) being based on the total weight of (A) through and including (E);

(F) from about 0.05 to about 10 percent by weight, based on the total weight of (A) through and including (E) of at least one oxidizing agent which is interactive with a peroxygen compound to produce free radicals which are capable of initiating and propagating free radical polymerization reactions wherein the oxidizing agent is added to effectively cure components (A)–(E) of the ambient temperature curable structural adhesive composition.

4. An ambient temperature-curable structural adhesive composition of claim 3 comprising
(A) from about 20 to about 50 percent by weight of said urethane olefinic-terminated liquid rubber wherein
  v is from about 55 to about 98 percent by weight;
  w is from about 2 to about 12 percent by weight;
  x is from 0 to about 26 pecent by weight;
  y is from 0 to about 26 percent by weight; and
  z is from 0 to about 0.5 percent by weight;
(B) from about 20 to about 70 percent by weight of said olefinic monomer;
(C) from 0 to about 25 percent by weight of said olefinic urethane reaction product;
(D) from about 2 to about 10 percent by weight of said phosphorous-containing compound;
(E) from about 0.1 to about 6 percent by weight of said reducing agent.

5. A multipack adhesive comprising a first and second package adhesive system, said packages being mixed at the time of use to provide a free radical curable adhesive;
said first package comprising
(A) from about 10 to about 80 percent by weight of a urethane olefinic-terminated liquid rubber having the formula:

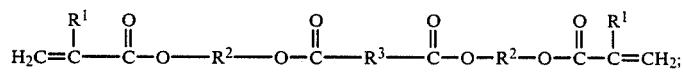

wherein $R^1$ is hydrogen, an alkyl group of 1 to 4 carbon atoms, —C=$CH_2$, or —$R^4$—CH=$CH_2$ wherein $R^4$ is an allylene group of 1 to 4 carbon atoms;
$R^2$ is

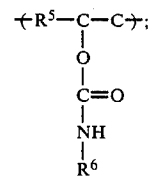

wherein $R^5$ is an alkylene group having from 1 to 6 carbon atoms and $R^6$ is phenyl, naphthyl or an alkylene group having from 1 to 24 carbon atoms or m-isopropenyl-α, α-dimethylbenzyl; and
$R^3$ is

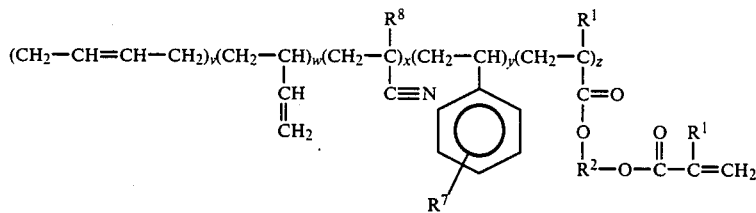

wherein $R^1$ and $R^2$ are as previously defined, $R^7$ is —CH=CH$_2$ or

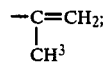

$R^8$ is hydrogen or methyl and v is in the range from about 5 to about 98 percent by weight; w is from zero to about 95 percent by weight; x is from zero to about 40 percent by weight; y is from zero to about 40 percent by weight; and z is from zero to about 5 percent by weight; said percent by weight being based on the total weight of $R^3$;

(B) from about 10 to about 90 percent by weight of at least one olefinic monomer selected from the group consisting of methyl methacrylate, methyl acrylate, butyl acrylate, cyclohexyl acrylate, hexyl acrylate, 2-ethylhexyl acrylate, lauryl acrylate, dicyclopentadienyloxyethyl methacrylate, 2-ethylhexyl methacrylate, hexyl methacrylate, cyclohexyl methacrylate, lauryl methacrylate, tetrahydrofurfuryl methacrylate, butyl methacrylate, ethyl acrylate, diethylene glycol dimethacrylate, metharylic acid, acrylic acid, acrylonitrile, methacrylonitrile, styrene, vinyl styrene, vinyl acetate, chlorostyrene, glycidyl methacrylate, itaconic acid, acrylamide, methacrylamide, vinylidene chloride, 2,3-dichloro-1,3-butadiene, 2-chloro-1,3-butadiene, methylstyrene and n-butyl styrene;

(C) from 0 to about 40 percent by weight of an olefinic urethane reaction product of an isocyanate-functional prepolymer and a hydroxy-functional monomer having an unit of polymerizable olefinic unsaturation, such reaction product being characterized by the presence of at least two units of olefinic unsaturation and the substantial absence of free isocyanate groups wherein said hydroxy-functional monomer has an average molecular weight from about 50 to about 3,000; and said isocyanate functional prepolymer is an adduct of polyisocyanate compound having at least two free isocyanate groups and a polyol having an molecular weight from about 50 and about 3000;

(D) from 0.1 to about 20 percent by weight of a phosphorus-containing compound having one or more olefinic group and no less than one P—OH groups, said phosphorous-containing compound having the formula

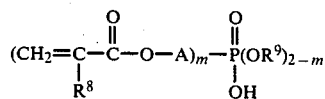

wherein $R^8$ is selected from the group consisting of hydrogen, an alkyl group having from 1 to 8 carbon atoms, and CH$_2$—C—; $R^9$ is selected from the group consisting of hydrogen, an alkyl group having from 1 to 8 carbon atoms; A is selected from the group consisting of $R^{10}O$ and $(R^{11}O)_n$, wherein $R^{10}$ is an aliphatic or cycloaliphatic alkylene group containing from 1 to 9 carbon atoms; $R^{11}$ is an alkylene group having from 1 to 7 carbon atoms; n is an integer from 2 to 10, and m is one or two; and, (E) an ambient temperature-active free radical source which is capable of initiating and propagating the cure of said adhesive compositon
the weight percents of each of (A) through and including (E) being based on the total weight of (A) through and including (E);

(F) from about 0.05 to about 10 percent by weight, based on the total weight of (A) through and including (E) of at least one oxidizing agent which is interactive with a peroxygen compound to produce free radicals which are capable of initiating and propagating free radical polymerization reactions; and said second package comprising
a bonding accelerator containing at least one oxidizing agent of a room temperature-active redox couple catalyst system, said oxidizing agent being reactive at room temperature with said agent (E), when said first and second packages are mixed, to produce free radicals which are capable of initiating and propagating free radical polymerization reactions, the amount of said oxidizing agent being sufficient to interact with the total amount of agent (E).

6. A multipack adhesive of claim 5 wherein said first package further comprises:

(G) from 0 to about 60 percent by weight of a polymeric material having an intrinsic viscosity from about 0.1 to about 1.3, said polymeric material obtained from polymerization of a styrene monomer, acrylic monomer, substituted acrylic monomer, olefinic non-acrylic monomer or mixtures thereof;

(H) from 0 to about 5 percent by weight of an unsaturated dicarboxylic acid ester;

(I) from 0.005 to about 15 percent by weight of a mixture of a metal molybdate and an inert filler; and (J) from 0 to about 20 percent by weight of an unsaturated carboxylic acid having one or more carboxylic acid groups.

7. A multipack adhesive of claim 6 comprising
(A) from about 20 to about 50 percent by weight of said urethane olefinic-terminated liquid rubber wherein v is from about 55 to about 98 percent by weight;
w is from about 2 to about 12 percent by weight;
x is from 0 to about 26 percent by weight;

y is from 0 to about 26 percent by weight; and z is from 0 to about 0.5 percent by weight.

8. A multipack adhesive of claim 6 wherein
said metal molybdate is selected from the group consisting of zinc molybdate, calcium molybdate, barium molybdate, strontium molybdate and mixtures thereof;

said inert filler is selected from the group consisting of zinc phosphate, calcium phosphate, magnesium phosphate calcium carbonate and mixtures thereof;

wherein said metal molybdate is from about 0.5 to about 3 parts per part of said metal phosphate.

9. A multipack adhesive of claim 7 wherein said olefinic monomer is dicyclopentadienyloxyethyl methacrylate.

10. A multipack adhesive of claim 8 wherein said metal molybdate is calcium molybdate.

11. A multipack adhesive of claim 8 wherein said inert filler is calcium phosphate.

12. A multipack adhesive of claim 10 wherein said free radial source is selected from the group consisting of peroxides and azo compounds.

13. A multipack adhesive of claim 11 wherein said reducing agent is selected from the group consisting of diisopropyl-p-toluidine, dimethylaniline and dimethyl-p-toluidine.

14. A multipack adhesive of claim 13 wherein said first package further comprises of from about 1 to about 10 percent by weight of metal metasilicate; and from about 1 to about 10 percent by weight of silica.

15. A multipack adhesive of claim 14 wherein said metal metasilicate is calcium metasilicate.

16. A multipack adhesive of claims 5 or 15 wherein said second package further comprises of
from about 70 to about 99.5 percent by weight of said second package of a carrier vehicle comprising at least one inert organic diluent, said carrier vehicle being capable of maintaining said oxidizing agent as a stable solution or dispersion.

17. A multipack adhesive of claim 16 wherein said second package comprises from about 0.5 to about 50 percent by weight of said second package of said oxidizing agent.

18. A multipack adhesive of claim 17 wherein said oxidizing agent comprises benzoyl peroxide.

19. A multipack adhesive of claim 17 wherein said phosphorous-containing compound comprises 2-methacryloyloxyethyl phosphate.

20. A multipack adhesive of claim 19 wherein said second package further comprises
bisphenol A epoxy resin having a molecular weight from about 300 to about 10,000.

* * * * *